United States Patent
George

(10) Patent No.: US 7,052,163 B2
(45) Date of Patent: May 30, 2006

(54) LIGHTING DEVICE FOR THE TRUNK OF A CONVERTIBLE MOTOR VEHICLE

(75) Inventor: Aubert Thibaud Michel Marie George, Mareil-Marly (FR)

(73) Assignee: Peugeot Citroën Automolbiles, S.A., Neuilly sur Seine (FR)

( * ) Notice: Subject to any disclaimer, the term of this patent is extended or adjusted under 35 U.S.C. 154(b) by 0 days.

(21) Appl. No.: 10/491,577

(22) PCT Filed: Sep. 27, 2002

(86) PCT No.: PCT/FR02/03293

§ 371 (c)(1),
(2), (4) Date: Apr. 2, 2004

(87) PCT Pub. No.: WO03/033301

PCT Pub. Date: Apr. 24, 2003

(65) Prior Publication Data

US 2004/0240220 A1      Dec. 2, 2004

(30) Foreign Application Priority Data

Oct. 15, 2001   (FR) .................................. 01 13242

(51) Int. Cl.
*B60Q 1/00*     (2006.01)

(52) U.S. Cl. ...................... 362/496; 362/493; 362/487; 362/479; 362/490

(58) Field of Classification Search ................ 362/496, 362/464, 493, 503, 490, 523, 526, 527, 545, 362/549, 487, 488, 479, 471; 296/220.01, 296/107.08

See application file for complete search history.

(56) References Cited

U.S. PATENT DOCUMENTS 6,672,658 B1 *   1/2004   De Gaillard ........... 296/220.01
6,773,129 B1 *   8/2004   Anderson et al. .............. 362/84

FOREIGN PATENT DOCUMENTS

| EP | 0960774 | 12/1999 |
|---|---|---|
| FR | 2696375 | 12/1993 |
| JP | 07164963 | 6/1995 |

OTHER PUBLICATIONS

Patent Abstracts of Japan, vol. 1995, No. 09, Published Oct. 31, 1995 (*pertaining to JP 07 164963 (Mazda Motor Corp.), Published Jun. 27, 1995).

* cited by examiner

Primary Examiner—Sandra O'Shea
Assistant Examiner—Bertrand Zeade
(74) Attorney, Agent, or Firm—Gary M. Cohen

(57) ABSTRACT

A lighting device is provided for illuminating the trunk of a motor vehicle having a retractable roof which can be stowed in the trunk. The retractable roof includes a front roof element and a rear roof element which can be moved between a position in which the roof elements cover the vehicle and a position in which the roof elements are stored in the trunk. At least one of the roof elements is provided with a lighting device for illuminating the passenger compartment when the roof is covering the vehicle. Detectors are provided for detecting when the roof is folded-up and stowed in the trunk and when the trunk lid of the vehicle is opened. The detectors are connected to a controller so that the lighting device is illuminated when the roof is folded-up in the trunk and the trunk lid is at the same time opened.

13 Claims, 1 Drawing Sheet

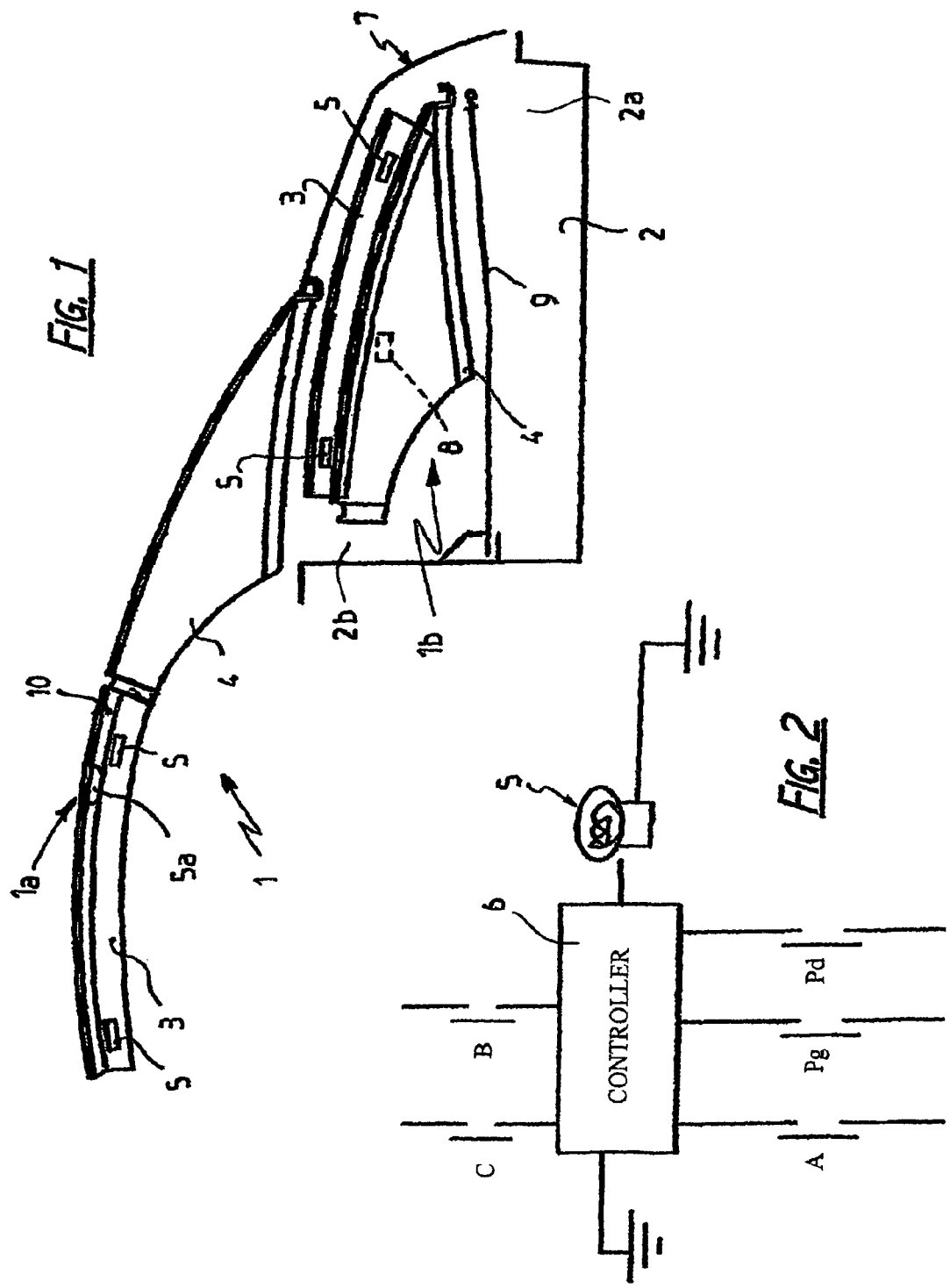

LIGHTING DEVICE FOR THE TRUNK OF A CONVERTIBLE MOTOR VEHICLE

BACKGROUND OF THE INVENTION

The present invention relates to a lighting device for the rear trunk of a convertible motor vehicle, and more particularly, to a device for lighting the rear trunk of a motor vehicle provided with a roof that can be retracted into the trunk.

One type of roof that can be retracted into the trunk of a motor vehicle includes a rigid front roof element and a rear roof element which forms a rear window. The front and rear roof elements are connected to the body of the vehicle so the two elements can be moved between a position in which the two elements cover the vehicle and a position in which the two elements are stowed in the rear trunk.

It will be understood that for this type of vehicle, when the roof is stowed in the trunk, the traditional means provided for lighting the trunk, which are arranged in an upper part of the trunk, are partially obscured and thus rendered ineffective.

In an effort to resolve this problem, the means provided for lighting the trunk can conceivably be positioned in the bottom part of the trunk. However, such an arrangement is not satisfactory for illuminating the trunk when the roof is covering the vehicle because the means for lighting the trunk can very quickly become obscured by objects being transported in the trunk.

SUMMARY OF THE INVENTION

To overcome all or part of the foregoing disadvantages, the present invention provides a device for lighting the trunk of a motor vehicle using a roof-mounted lighting device that can be retracted into the rear trunk of the vehicle. The roof of the vehicle includes a rigid front roof element and a rear roof element which forms a rear window, and the front and rear roof elements are connected to the body of the vehicle so the two roof elements can be moved between a position in which the two roof elements cover the vehicle and a position in which the two roof elements are stowed in the rear trunk. At least one of the roof elements is provided with at least a first device for lighting the cabin when the roof is in the vehicle-covering position. The first lighting device additionally includes detectors for respectively detecting the presence of the roof in the folded position (in the trunk) and when the lid of the rear trunk of the vehicle is open. The detectors are connected to a controller in order to illuminate the first lighting device when the roof is in the folded position and when, at the same time, the trunk lid is in the open position.

The first lighting device is arranged on the front roof element so as to be situated opposite to the transparent part of the rear window when the roof is in a stowed position in the trunk, to provide lighting for the trunk.

Advantageously, the detector for detecting when the lid of the trunk is open is additionally associated with a second lighting device arranged in the upper part of the trunk in order to illuminate or extinguish the second lighting device in accordance with the state of the detector.

The present invention also relates to a convertible motor vehicle equipped with a roof that can be retracted into the rear trunk, and having a device for lighting the trunk as previously indicated.

In an alternative embodiment, the vehicle can in conventional fashion include a separating screen inside the trunk to define an upper compartment intended for stowing the roof and a lower compartment intended for luggage. In such an embodiment, and in accordance with the present invention, the separating screen is made from a large-mesh textile material or from a translucent material in order to allow the light emitted by the first lighting device to pass through the separating screen and to the lower compartment.

Further detail regarding features of the present invention is provided with reference to the description of an exemplary embodiment of the invention which is provided below, together with the following drawings.

BRIEF DESCRIPTION OF THE DRAWINGS

FIG. 1 is a schematic view showing a retractable roof in accordance with the present invention, and the rear trunk of a vehicle.

FIG. 2 is a schematic diagram of an electric circuit for operating the lighting device of the present invention.

DETAILED DESCRIPTION OF THE INVENTION

FIG. 1 shows a roof 1 that can be retracted into the rear trunk 2 of a convertible vehicle. The roof 1 includes a rigid front roof element 3 and a rear roof element 4 which forms a rear window for the vehicle. The roof elements 3, 4 are connected to the body of the vehicle by means (not shown) which are themselves known for allowing the roof elements 3, 4 to be moved between a position 1a in which the roof elements 3, 4 cover the vehicle and a position 1b in which the roof elements 3, 4 are stowed in the rear trunk 2. Because the means for allowing the roof elements 3, 4 to be operated in this manner are not necessary to an understanding of the present invention, such means have not been described in the remainder of the description which follows.

It is conventional for at least one of the roof elements, preferably the front roof element 3, to be provided with at least one device 5 for lighting the cabin when the roof 1 is in the vehicle-covering position 1a. The lighting device 5 is connected in conventional manner to a lighting controller 6 (see, FIG. 2) for illuminating or extinguishing the lighting device in accordance with information regarding the state of means associated with the vehicle, for example, for detecting that a portion of the vehicle has been opened, or upon actuation, at A, by an occupant of the vehicle. In the embodiment illustrated, such state information pertains to whether the doors of the vehicle are opened or closed, and is denoted by the references Pd and Pg, for the right door and the left door, respectively. The actuators Pg, Pd and A can be switches, for example, as is schematically illustrated in FIG. 2.

In accordance with the present invention, the lighting device 5 is additionally provided with detectors, denoted by the references B and C, for respectively detecting the presence of the roof 1 in the folded position 1b, and the opening of the lid 7 of the rear trunk of the vehicle. The detectors B, C are connected to the lighting controller 6 in order to illuminate the lighting device 5 of the roof when the roof 1 is in the folded position 1b and when, at the same time, the trunk lid 7 is in an opened position.

The detector C for detecting when the trunk lid 7 is in the opened position is additionally associated with a second lighting device 8 which is located in the upper part of the trunk 2, in order to illuminate or extinguish the second lighting device 8 as a function of the state of the detector C for detecting the position of the lid 7.

To better illustrate operations of the device of the present invention, FIG. 2 shows an electrical diagram of the lighting device. The operational logic for the lighting device of the present invention includes the following states, which are responsive to the states of the various detectors. When the detectors C and B are actuated, the first lighting device is illuminated, in this case, for lighting the trunk. When the detector A is actuated, the first lighting device is again illuminated, in this case, for lighting the cabin, as an example. When the detector C is actuated, the second lighting device is illuminated, for lighting the trunk. When either of the detectors Pg or Pd is actuated, the first lighting device is illuminated, in this case, for lighting the cabin.

It will be understood that the supply of electric power for operating the first lighting device 5 is provided by wiring that follows a route along the link rods of the roof mechanism 1 that is common to the route taken by the existing wiring for supplying electric power to the locks (not shown) which are installed at the front of the roof 1, for automated operation of the roof.

It will further be understood that when the roof elements 3, 4 are in the position 1b, stowed in the rear trunk 2, the first lighting device 5 will be arranged so that the lighting device 5 is situated opposite to the transparent part of the rear window formed by the roof element 4, which is then folded in the trunk 2. The lower compartment 2a which is developed under the roof 1 when in the stowed position 1b (for example, for storing luggage) is in this way illuminated through the rear window 4.

It will be noted that while the lights (the lighting devices 5) are represented on the sides of the roof 1, they can also be located in the mid-plane of the vehicle by being integrated with the roof lining 10, as shown at 5a, or at any point along the front roof element 3. It is only essential for at least a certain number of lights to be located opposite the rear window 4 when the roof 1 is in the folded position 1b, in the trunk 2, in order to ensure that the trunk is effectively illuminated.

In order to separate the luggage compartment 2a from a compartment 2b for stowing the roof 1 in the trunk 2, a separating screen 9 can, in known fashion, be arranged between the two compartments. The separating screen 9, shown in FIG. 1, is advantageously made, for example, from a large-mesh textile material or from a translucent material in order to allow the light emitted by the first lighting device 5 to pass through.

It will be understood from the foregoing description that the device of the present invention makes it possible for the trunk to have one or more lights installed in the upper regions of the trunk, allowing satisfactory lighting of the entire trunk when the roof is in the position 1a for covering the vehicle. When, however, these lights are obscured, especially by the rear pillars of the roof when the roof is in the stowed position in the trunk, effective lighting of portions of the trunk which are still available under the stowed roof is then provided by the first lighting device 5.

Although the present invention has been described in connection with a specific embodiment, it is to be understood that the present invention can equally comprise all technical equivalents of the various components which have been described.

The invention claimed is:

1. A device for illuminating a trunk of a motor vehicle having a roof that can be retracted into the trunk of the vehicle, wherein the roof has two roof elements including a front roof element and a rear roof element which defines a rear window, wherein the roof elements are connected to body portions of the vehicle for moving the roof elements to and between a first position in which the roof elements cover the vehicle and a second position in which the roof elements are stowed in the trunk, and wherein the illuminating device comprises:
   a first lighting device associated with one of the roof elements for illuminating cabin portions of the vehicle when the roof is in the first position;
   a first detector for detecting when the roof is in the second position;
   a second detector for detecting when a lid associated with the trunk is in an opened position; and
   a controller operatively associated with the first detector and the second detector;
   wherein the controller illuminates the first lighting device when the first detector detects that the roof is in the second position and the second detector simultaneously detects that the lid of the trunk is in the opened position, thereby illuminating the trunk of the motor vehicle.

2. The device of claim 1 wherein the second detector is additionally operatively associated with a second lighting device arranged in upper portions of the trunk.

3. The device of claim 2 wherein the second detector is operatively associated with the second lighting device to illuminate and extinguish the second lighting device responsive to state conditions of the second detector.

4. The device of claim 3 wherein the second detector is operatively associated with the second lighting device to illuminate the second lighting device when the lid of the trunk is in the opened position, and to extinguish the second lighting device when the lid of the trunk is in a closed position.

5. The device of claim 1 wherein the first lighting device is arranged on the front roof element so that when the roof is in the second position, the first lighting device is in alignment with the rear window.

6. The device of claim 5 wherein the rear window includes transparent portions, and wherein the first lighting device is aligned with the transparent portions of the rear window when the roof is in the second position.

7. The device of claim 1 wherein the front roof element is a rigid structure.

8. A convertible motor vehicle which comprises a roof that can be retracted into a trunk of the motor vehicle, and a device in accordance with claim 1 for illuminating the trunk of the motor vehicle.

9. The vehicle of claim 8 wherein the trunk of the motor vehicle includes a separating screen which defines an upper compartment for receiving the roof and a lower compartment for storage, and wherein the separating screen is made from a material for passing light from the first lighting device to the lower compartment.

10. The vehicle of claim 9 wherein the separating screen includes portions formed of a large-mesh textile material.

11. The vehicle of claim 9 wherein the separating screen includes portions formed of a translucent material.

12. The vehicle of claim 8 wherein the first lighting device is arranged on the front roof element so that when the roof is in the second position, the first lighting device is in alignment with the rear window.

13. The vehicle of claim 12 wherein the rear window includes transparent portions, and wherein the first lighting device is aligned with the transparent portions of the rear window when the roof is in the second position.

* * * * *